(12) United States Patent
Sabot et al.

(10) Patent No.: US 11,144,044 B2
(45) Date of Patent: Oct. 12, 2021

(54) APPARATUS AND METHOD FOR ALARM MANAGEMENT

(71) Applicants: General Electric Company, Schenectady, NY (US); Ecole Normale Supérieure de Cachan, Cachan (FR)

(72) Inventors: Hervé Sabot, Paris (FR); Yannick Laumonier, Paris (FR); Jean-Jacques Lesage, Cachan (FR); Jean-Marc Faure, Cachan (FR)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 16/561,684

(22) Filed: Sep. 5, 2019

(65) Prior Publication Data

US 2020/0249667 A1    Aug. 6, 2020

(30) Foreign Application Priority Data

Jan. 31, 2019   (EP) ..................... 19305116

(51) Int. Cl.
| | |
|---|---|
| *G05B 23/02* | (2006.01) |
| *G08B 29/18* | (2006.01) |
| *G06F 11/07* | (2006.01) |
| *G06F 17/10* | (2006.01) |
| *H04L 12/24* | (2006.01) |
| *G08B 29/04* | (2006.01) |

(52) U.S. Cl.
CPC ..... *G05B 23/0281* (2013.01); *G05B 23/0272* (2013.01); *G06F 11/0703* (2013.01); *G06F 17/10* (2013.01); *G08B 29/04* (2013.01); *G08B 29/188* (2013.01); *H04L 41/0609* (2013.01); *H04L 41/0613* (2013.01); *H04L 41/0631* (2013.01); *G06F 11/0793* (2013.01); *H04L 41/069* (2013.01)

(58) Field of Classification Search
None
See application file for complete search history.

(56) References Cited

U.S. PATENT DOCUMENTS

| | | | |
|---|---|---|---|
| 2017/0279298 A1* | 9/2017 | Li | H02J 13/00034 |
| 2018/0322770 A1 | 11/2018 | Srinivasan | |

OTHER PUBLICATIONS

Simeu-Abazi et al., "A methodology of alarm filtering using dynamic fault tree" Reliability Engineering and System Safety 96 (2011) 257-266 (Year: 2011).*

Tang et al., "Event Driving Based Alarm Correlation Approach by Using Petri Net" The 1st International Conference on Information Science and Engineering (ICISE2009) (Year: 2009).*

(Continued)

*Primary Examiner* — John C Kuan
(74) *Attorney, Agent, or Firm* — Fitch, Even, Tabin & Flannery LLP

(57) ABSTRACT

A Petri net that corresponds to the mathematical model is determined and the Petri net includes the domination relationships and mutual dependency relationships between individual alarms. The Petri net is analyzed to determine a set of construction rules. The construction rules define an approach to reduce the number of alarms presented to an operator or a computer program.

15 Claims, 4 Drawing Sheets

(56) References Cited

OTHER PUBLICATIONS

Hu et al., "Process Discovery of Operator Actions in Response to Univariate Alarms" Preprint, 11th IFAC Symposium on Dynamics and Control of Process Systems, including Biosystems, Jun. 6-8, 2016. NTNU, Trondheim, Norway (Year: 2016).*
European Extended Search Report, European Application No. 19305116.6, dated Jul. 8, 2019, 8 pages.
Yufan, Guan, et al., "Implementing Intelligent Techniques for the Advanced Alarm Processing." Intelligent System Applications to Power Systems, 2009. Nov. 8, 2009, 6 pages.

* cited by examiner

APPARATUS AND METHOD FOR ALARM MANAGEMENT

BACKGROUND OF THE INVENTION

Field of the Invention

The subject matter disclosed herein generally relates to the management of alarms.

Brief Description of the Related Art

Various types of industrial machines are used to perform various tasks. For example, boilers, fans, engines, wind turbines, generators, manufacturing devices, cutters, drills, saws, presses, vehicles, or power equipment are used to perform various functions. This equipment can be used in factories, wind farms, offices, businesses, or various other locations.

Sensors are often deployed at, in, or around these machines to sense conditions directly or indirectly indicative of machine operation. Sensed parameters may include the speed of the machine, the condition of the machine, internal pressures of the machine, the operating state of the machine to mention a few examples. This information can be compared to predetermined thresholds and an alarm can be created that indicates when the machine goes beyond ideal operating conditions (e.g., when an operating characteristic exceeds a threshold).

An alarm is defined in the ANSI/ISA 18.2 standard as an audible and/or visible means of indicating to the operator an equipment malfunction, process deviation or abnormal condition requiring a timely response. Alarm systems play a primordial role for efficient and safe operation of modern industrial plants such as power plants, refineries, petrochemical facilities and manufacturing systems to mention a few examples.

With the use of computer assisted design tools and wireless sensors technologies allowing easy monitoring of numerous variables or parameters, the number of alarms has drastically increased in the recent years. Consequently, excessive alarm flows ("alarm floods"), where sequences of numerous alarms occur in a short period of time, often occur in today's industrial environment. As operators cannot react quickly enough to these alarm floods, off-specification products may be produced, the performance of the plant may suffer, and hazardous events may occur.

BRIEF DESCRIPTION OF THE INVENTION

Generally speaking, the present approaches determine systematic causality relations between alarms (e.g., domination and mutual dependency relations). These relations are represented by temporal and non-temporal Petri nets to allow the alarm reduction to be swiftly performed by a human expert and/or a machine (e.g., using a computer program). More specifically, Petri nets are used on an alarm log modelled as a sequence of events to represent the systematic behaviors of the alarms caused by causal relationships between the alarms. This provides a direct representation of these relations by temporal and non-temporal Petri nets. The Petri nets are analyzed to create construction rules, which are applied to filter a real-time sequence of alarms.

In some aspects, alarm occurrences are modeled as events and alarm logs are modeled as event sequences. From this modeling, domination and mutual dependency relationships are determined between the different alarms. These relations contain the information concerning alarms redundancies.

For operational safety reasons, these analyses need to be validated by an "expert" (human or machine) where the expert is aware of and in some aspects has mastered the process that generated the alarm log. To reduce the analysis time, save the expert's time and facilitate their work, the identified relationships are graphically represented in the form of Petri nets.

In one example, the transitions of the Petri net are the tags of the alarms and different transitions/alarms are graphically linked if a domination relationship or mutual dependency relationship has been identified between two alarms. If that is the case, the duration between the successive occurrences of those alarms are represented by an interval associated to the place between those transitions/alarms following the P-temporal Petri net formalization. Once all the relationships are modeled, a human expert or machine can determine rules that identify the alarms to be filtered to reduce the number of alarms coming to an operator. In one example, the approaches may significantly reduce the number of alarms presented to operators (e.g., in one example and in the case of a thermal power plant, a reduction of 38% in the number of alarms presented and handled by operators during an alarm flood).

Advantageously, the present approaches reduce the alarm flow reaching the operators at industrial machine control systems, which helps them to diagnose the issues generating those alarms when a problem occurs. Systematic interactions between alarms/events identified and visualized using a formal graphical representation which is the Petri net. This representation eases and guides the expert during the alarm reconfiguration stage.

In many of these embodiments, alarm data is obtained from sensors in industrial machines. The alarm data is stored at a database, and the database is disposed at a central location. The alarm data is ordered as a sequence of individual alarms. Relationships between the individual alarms are selectively determined and the relationships are selectively stored in a mathematical model. The relationships include domination relationships and mutual dependency relationships between the individual alarms. The mathematical model includes discrete alarm events and the sequence of the discrete alarm events.

A Petri net that corresponds to the mathematical model is determined and the Petri net includes the domination relationships and mutual dependency relationships between the individual alarms. The Petri net is analyzed to determine a set of construction rules. The construction rules define an approach to reduce the number of alarms presented to an operator or a computer program.

A plurality of real-time alarms are then sensed at the industrial machines. The construction rules are applied to the real-time alarms to obtain a reduced set of real-time alarms.

The reduced set of real-time alarms are presented to an operator or to a first computer program. The operator or the computer program causes actions to be performed. The actions include one or more of: activating a selected industrial machine, deactivating a selected industrial machine, sending a message to human for the human to investigate a selected machine, causing a robot to travel to investigate an alarm at a selected industrial machine. Other examples of actions are possible.

In aspects, the construction rules are implemented as computer code and the computer code is configured with new parameters (physically changed) over time based upon new alarm data.

In examples, the industrial machines are one or more of: boilers, fans, engines, wind turbines, generators, manufacturing devices, cutters, drills, saws, presses, vehicles, or power equipment. Other examples of industrial machines are possible. In other examples, the sensors measure one or more of the speed, temperature, pressure, direction, size, weight, or dimension of an industrial machine or of an industrial process. Other examples of parameters are possible.

In some other aspects, mathematical model includes equations. In other examples, the Petri net represents alarms as unique transitions in the Petri net. In yet other examples, the analyzing of the Petri net comprises analyzing the Petri net by a second computer program or by a human.

In others of these embodiments, a system includes a plurality of industrial machines, a plurality of sensors, a first database, and a second database. The plurality of sensors are deployed at the industrial machines. The sensors are configured to obtain alarm data from the sensors at industrial machines.

The database is deployed at a central location and the alarm data is stored at a database. The database is disposed at a central location.

The first control circuit is deployed at the central location. The first control circuit is configured to order the alarm data in the database as a sequence of individual alarms, determine relationships between the individual alarms, and selectively store the relationships in a mathematical model. The relationships include domination relationships and mutual dependency relationships between the individual alarms. The mathematical model includes discrete alarm events and the sequence of the discrete alarm events.

The first control circuit is configured to determine a Petri net that corresponds to the mathematical model. The Petri net including the domination relationships and mutual dependency relationships between the individual alarms. The first control circuit or a human analyze the Petri-net to determine a set of construction rules. The construction rules define an approach to reduce the number of alarms presented to an operator or a computer program.

The construction rules are subsequently sent to a second control circuit via a second network. The sensors are configured to sense a plurality of real-time alarms at the industrial machines. The second control circuit is configured to apply the construction rules to the real-time alarms to obtain a reduced set of real-time alarms and to present the reduced set of real-time alarms to an operator or to a first computer program. The operator or the first computer program causes actions to be performed, the actions being one or more of: activating a selected industrial machine, deactivating a selected industrial machine, sending a message to human for the human to investigate a selected machine, causing a robot to travel to investigate an alarm at a selected industrial machine.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the approaches described herein, modeling and analysis techniques for discrete event systems (DES) are used to reduce the number of alarms presented to human or machine operators where these operators are operating, monitoring, and/or controlling industrial machines. In some aspects, two systematic relations (domination and mutual dependency) between the alarms of a sequence are automatically discovered and/or determined. The discovered or determined relations are then analyzed by an expert (human or machine) to validate redundancies. This analysis relies on the representation of the relations in the form of Petri nets (PNs). Construction rules are determined and these are applied to real-time alarm events to filter the events that are presented to human or machine operators.

As described herein, alarms can be seen as Boolean variables that have a value is 1 when the corresponding alarm is active and a value of 0 when the alarm is inactive. The occurrence of an alarm can therefore be seen as the rising edge of the associated variable and the disappearance of an alarm as the falling edge of this variable. In aspects, alarms appearances are the result of anomalous evolutions of the process whereas their disappearances can be due to the process evolution or to be the consequence of an operator acknowledgment. The approaches provided herein find systematic relations between alarms generated by a process performed at an industrial machine, and from this filter the alarms that are to be considered by a human or machine operator of an industrial machine.

Alarm occurrences, noted $\alpha i$, are considered as rising edge events whose occurrences are instantaneous and asynchronous. Hence, simultaneous alarm occurrences are not considered. Moreover, physical time is not considered; in aspects, only the order of alarm occurrences is kept to build an alarm sequence is considered. It will be appreciated that the concatenation of two sequences is a noncommutative operation that builds a sequence which is composed of the first sequence followed by the second one.

Figure 1:
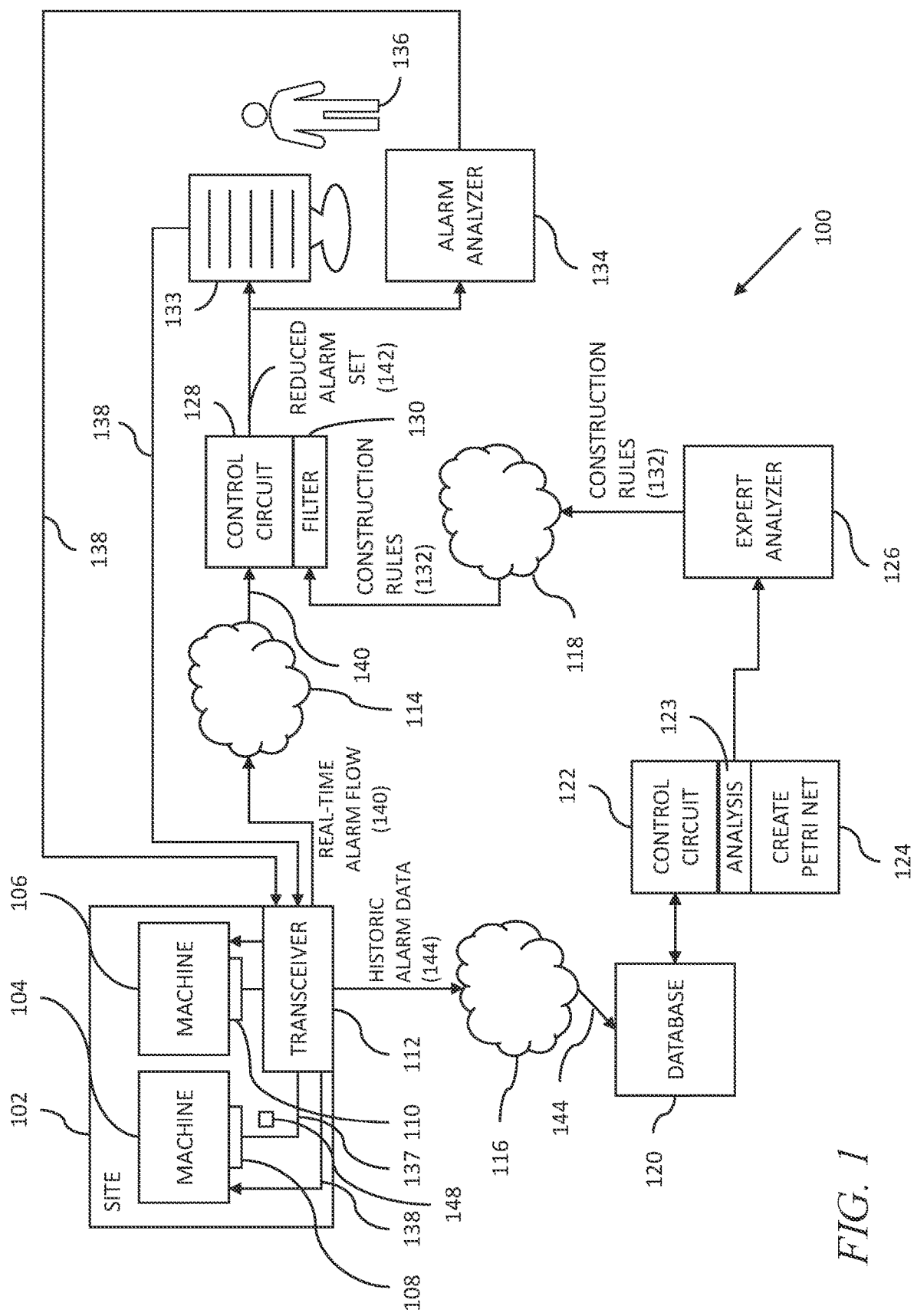
FIG. 1 comprises a diagram of a system according to various embodiments of the present invention.

Referring now to FIG. 1, one example of a system 100 that reduces the number of alarms presented to a human operator or automated process is now described. The system includes a site 102. The site 102 includes a first machine 104 (with a sensor 108), a second machine 106 (with a sensor 110), and a transceiver circuit 112. The system 100 also includes a first electronic communication network 114, a second electronic communication network 116, and a third electronic communication network 118. The system further includes a first control circuit 122, a second control circuit 128, a database 120, a user interface 133, an alarm analyzer 134, and an expert analyzer 126. Whether an alarm exists may be determined in some examples by comparing measured or sensed data obtained by the sensors 108 and 110 to thresholds. The sensors 108 may create or identify an alarm. The alarm may be determined at the transceiver circuit 112 (or some other control circuit or at any other location in the system 100). The alarm may be represented as a separate Boolean operator, data structure, variable, set of data, or any other construct or combination of constructs.

The site 102 is any site including a factory, a business, a campus, a city, a state, a nation, or any site where industrial machines can be deployed or used. The sensors 108 and 110 are any type of sensing device that physically measure parameters such as speed, size, temperature, pressure, humidity, weight, direction, dimension, mechanical state, or logical state to mention a few examples. In examples, the sensors 108 and 110 identify and create alarms, while in other examples, another devices (e.g., the transceiver circuit 112 or a control circuit) creates alarms. The industrial machines 104 and 106 are any type of industrial machine such as boilers, fans, engines, wind turbines, generators, manufacturing devices, cutters, drills, saws, presses, vehicles, or power equipment. Other examples are possible.

The transceiver circuit 112 may be any combination of computer software and/or electronic hardware. The transceiver circuit 112 transmits and receives information from networks 114 and 116 (and possibly other networks). The transceiver circuit 112 may receive data from the sensors 108 and 110 and determine whether to create an alarm, or may receive already-created alarms from the sensors 108 and 110.

The first electronic communication network 114, second electronic communication network 116, and third electronic communication network 118 may be any type of electronic communication network or combination of networks such as the internet, wireless networks, cellular networks, local area networks, or wide area networks to mention a few examples. In addition and although shown as being different, distinct and separate networks in FIG. 1 it will be appreciated that these networks may be combined and, therefore, be the same network.

The database 120 may be any type of electronic memory storage device. Historic alarm data 144 may be directly loaded from the network 116 into the database 120 or may be loaded via the control circuit 122. The user interface 133 may be any type of interface such as a smartphone, personal computer, laptop, or tablet to mention a few examples. The user interface 133 may include a graphical display (e.g., a screen or touch screen) and data entry devices (e.g., a keyboard or computer mouse). The historic alarm data may identify alarms, the time of an alarm, the location of an alarm, measured parameters associated with the alarm, or other types of information.

The first control circuit 122 determines alarm sequences and relationships from the historic alarm data 144 using an analysis program 123. The first control circuit 122 also creates Petri nets using a Petri net creation program 124.

The expert analyzer 126 may be a human or a computer program (e.g., stored in a memory storage device and executed by the control circuit 122 or some other control circuit). The expert analyzer 126 analyzes the Petri nets created by the control circuit 122 and creates construction rules 132 that are sent to the second control circuit 128 via the network 118. In one example, the expert analyzer 126 is implemented by the control circuit 122. The second control circuit 128 includes a filter program 130 that utilizes the construction rules 132 to create a reduced alarm set 142 from real-time alarm data 140. The second control circuit 128 and the expert analyzer 126 may be deployed at the site 102, at a central processing center (e.g., at the same or different central location where the control circuit 122 is deployed), or at some other location.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuits 122 and 128 may be configured (for example, by using corresponding programming stored in a memory as will be well understood by those skilled in the art) to carry out one or more of the steps, actions, and/or functions described herein.

In one example of the operation of the system of FIG. 1, the plurality of sensors 108 and 110 are deployed at the industrial machines 104 and 106. The sensors 108 and 110 obtain alarm data 137 from the sensors from the industrial machines 104 and 106. This alarm data 137 includes historic alarm data 144 obtained over longer periods of time such as days, week, months, or years and real-time alarm data 140. The historic alarm data 144 is sent to and stored at the database 120 via the network 116. The alarm data 140 and 144 may be in any format indicates an alarm occurs and may include further details concerning the alarm (e.g., machine identifier, timestamp of when the alarm occurred to mention two examples). The alarm data 144 is historic data over longer period of times that is used to determine the construction rules 132 by which the number of alarms presented to operators can be reduced. The alarm data 140 is collected in real-time and a filter is applied in real-time (using the construction rules 132) to reduce the number of alarms considered by the operator 136 or an alarm analyzer 134.

The database 120 is deployed at a central location such as a headquarters, home office, or central processing or control center. The first control circuit 122 is also deployed at the central location. Other deployment locations are possible.

The first control circuit 120 is configured to order the alarm data 144 in the database 120 as a sequence of individual alarms, determine relationships between the individual alarms, and selectively store the relationships in a mathematical model (the mathematical also being stored in the database 120). The sequential order may be time order. Other examples of ordering are possible. These functions are accomplished by having the control circuit 122 execute an analysis program 123. The relationships include domination relationships and mutual dependency relationships between the individual alarms. The mathematical model includes discrete alarm events and the sequence of the discrete alarm events.

The first control circuit 120 is configured to determine a Petri net that corresponds to the mathematical model using the Petri net creation program 124. The Petri net so-created includes the domination relationships and mutual dependency relationships between the individual alarms. The expert analyzer (either a computer program executed by the first control circuit 120 or a human) analyzes the Petri-net to determine the set of construction rules 132. The construction rules 132 define an approach to reduce the number of alarms presented to an operator or a computer program. For example, the construction rules 132 may state that if both alarm a1 and alarm a2, occur, only display alarm a1. The construction rules 132 are subsequently sent to the second control circuit 128 via the network 118.

As mentioned, alarm data 137 obtained by the sensors 108 and 110 includes a plurality of real-time alarms 148 at the industrial machines. The real-time alarms 148 may, in aspects, may occur after the construction rules 132 have been determined. The second control circuit 128 is configured to apply the construction rules 132 to the real-time alarms (using the filter program 130) to obtain a reduced set 142 of real-time alarms and to present the reduced set 142 of real-time alarms to an operator 136 or to the alarm analyzer 134 (e.g., a computer program). The operator 136 or the analyzer 134 causes actions to be performed. The actions can be one or more of: activating a selected industrial machine 104 or 106 (using control signals 138), deactivating a selected industrial machine 104 or 106 (using control signals 138), sending a message to human for the human to investigate a selected machine (e.g., sending an email message to a human using one of the network 114 or some other network), or causing a robot to travel to investigate an alarm at a selected industrial machine (e.g., using a control signal 138 to activate a robot). These actions typically provide an interaction with or between physical objects. Once the robot (e.g., an automated ground vehicle or aerial drone) arrives at the machine, it may physically alter the machine. For example, the robot may remove a part and replace the old part with a new part on the machines 104 and 106.

Also as mentioned, control signals 138 may be sent to the industrial machines 104 and 106. These control signals 138 may be automatically generated (e.g., by the alarm analyzer 134) or manually generated by the operator 136 from the interface 132. The control signals 138 are transmitted directly or indirectly (e.g., via the network 114) to the machines 104 and 106 via the transceiver circuit 112. The control signals 138 may cause the machines 104 or 106 to operate in specified ways. For example, the control signals 138 may activate the industrial machine 104 or 106, deactivate the industrial machine 104 and 106, adjust the speed of the industrial machine 104 and 106, increase other operating parameters of the machine 104 or 106 (e.g., temperature or pressure), or result in a change of state of the machine 104 or 106. In other examples, the control signals 138 may allow access to the machine 104 or 106 (lock or unlock a door or compartment that provides access to the machine 104 or 106 or lock or unlock a door of the machine 104 or 106 allowing access to internal components of the machine 104 or 106). The control signals 138 may also control other devices or elements (e.g., a camera at the machine 104 or 106 where the control signals focus, zoom, or turn the camera). It will be appreciated that all of these are physical interactions between physical elements (e.g., between a robot and the industrial machine 104 or 106).

It will also be understood that the term "program" as used herein refers to computer executable instructions executed by a control circuit. However, it will be appreciated that any combination or electronic hardware or computer software can be used to implement a "program."

Another example of the operation of the system of FIG. 1 is now described. For this example, an alarm sequence is an ordered succession of alarm occurrences. Alarms are described according to a format ai where ai is a1, a2 ... an. The length of an alarm sequence S is noted as being |S|. For example, one example of an alarm sequence is (from the real-time alarm data 140):

$S = \alpha 1 \alpha 1 \alpha 5 \alpha 7 \alpha 1$ ... of length 16 that contains for example six occurrences of $\alpha 1$ and three occurrences of $\alpha 7$.

The set of all alarms $\alpha i$ whose occurrences constitute a sequence S is called the alphabet of the sequence S and is noted as being $\Sigma S$:

$$\Sigma S = \{\alpha 1, \alpha 2, \ldots, \alpha i, \ldots, \alpha |\Sigma S|\} \quad (1)$$

In the present example, the alphabet of the alarm sequence is:

$\Sigma S = \{\alpha 1, \alpha 5, \alpha 7, \alpha 8\}$. $\Sigma S$ is the set of all possible sequences that can be defined on the alphabet $\Sigma S$.

The projection of a sequence S on an alphabet $\Sigma$, Proj$\Sigma$ (S), consists of replacing all ai $\notin \Sigma$ by the identity element of a concatenation operation $\epsilon$.

If $S = \alpha 1 \alpha 1 \alpha 5 \alpha 7 \alpha 1 \alpha 8 \alpha 5 \alpha 7 \alpha 1 \alpha 1 \alpha 8 \alpha 1 \alpha 5 \alpha 7 \alpha 8 \alpha 8$ and $\Sigma = \{\alpha 1, \alpha 7\}$, then:

Proj$\Sigma$ (S) = $\alpha 1 \alpha 1 \epsilon \alpha 7 \alpha 1 \epsilon \epsilon \alpha 7 \alpha 1 \alpha 1 \epsilon \alpha 1 \epsilon \alpha 7 \epsilon \epsilon$.

$$= \alpha 1 \alpha 1 \alpha 7 \alpha 1 \alpha 7 \alpha 1 \alpha 1 \alpha 1 \alpha 7 \quad (2)$$

Given an alarm sequence S observed during the operation of an industrial process P at the machines 104 or 106, the second control circuit 128 finds a reduced alarm sequence $\tilde{S}$ such that $|\tilde{S}| \ll |S|$, with $\Sigma \tilde{S} \subseteq \Sigma S$, and such that this reduction does not induce a loss of safety on the process P.

To achieve this goal, the present approaches make a determination and identification of all alarms that could be suppressed that cause S to be transformed to $\tilde{S}$. In these regards, redundant information is examined in $\Sigma S$ under the form of systematic relations linking some of the alarms, in such a way that the suppression of those alarms implies no loss of information related to the dysfunctional behavior of the system. In aspects, these functions can be performed by the control circuit 122.

After the systematic relations are identified, the construction rules 132 are determined, which identify alarms that can be suppressed without loss of safety. The construction rules 132 can be determined by the expert analyzer 126. In aspects, this step requires an expertise of the process P. In other aspects, the systematic relations determined or discovered in the previous step by the first control circuit 122 are modeled as Petri nets.

An alarm sequence observed during a long period of operation of a process is not only a very long succession of alarm occurrences, but also contains information related to the history of the dysfunctional behavior of the process. As mentioned, one goal of the approaches described herein is to extract from S systematic relations between some alarms that express redundant dysfunctional information. For that, systematic causality relationships between alarms are searched under the form of sufficient conditions such as "it is sufficient to observe a to know that a AND b" or "it is sufficient to observe a OR b to know that a AND b".

Domination relationships can also be described and determined by the control circuit 122. Let S be an alarm sequence defining an alphabet $\Sigma S$ and $\alpha i$ and $\alpha j$ be two different alarms of $\Sigma S$ that define two singleton alphabets $\{\alpha i\}$ et $\{\alpha j\}$.

$\alpha i$ dominates $\alpha j$, noted $\alpha i \rightarrow \alpha j$, if and only if (iff) the projection of S on $\{\alpha i\} \cup \{\alpha j\}$ is an alternation between a non-null length sequence of occurrences of $\alpha i$ and only one occurrence of $\alpha j$:

Proj$\{\alpha i\} \cup \{\alpha j\}(S) = \sigma i, 1 \alpha j \; \sigma i, 2 \alpha j \sigma i, 3 \alpha j \sigma i, 4 \ldots$ with $\forall \; k \in \mathbb{N}^*, \{\sigma i, k \in \{\alpha i\}^* | \sigma i, k| \geq 1$ αi dominates αj implies that before every occurrence of αj at least one occurrence of αi has been observed. Therefore, the observation of αj is sufficient to know that the dysfunctional behavior of P has been αi αj. Thus, all αi occurring before an occurrence of αj in Proj{αi} ∪ {αj}(S) can be suppressed in S.

When applying this domination relations search on the sequence of the present example:
S=α1α1α5α7α1α8α5α7α1α1α8α1α5α7α8α8, for the two alarms α1 and α5, it comes:
ProjΣi ∪ Σj
(S)=α1α1α5εα1εα5εα1α1εα1α5εεε=α1α1α5α1α5α1-α1α1α5
=σi,1α5σi,2α5 σi,3α5
=>α1→α5

As α1→α5, the reduced sequence S̃ is obtained from the original sequence by following construction rules 132 that specify removing every occurrence of α1 which is followed by one occurrence of α5.
S̃=α1α1α5α7α1α8α5α7α1α1α8α1α5α7α8α8
=α1α5α7α8α5α7α1α1α8α5α7α8α8

One specific physical interpretation of the domination relation can be explained by taking the example of the process P on which S has been observed. In this process, a1 is an alarm meaning that a "High pressure level" of a fluid is reached at one of the machines 104 or 106, and a5 means that this fluid reached a "Very high pressure level". The relation "a1 dominates a5" expresses the fact that before reaching a "very high" level, the pressure has to reach the "high" pressure level. Giving to an operator the information that a "high" and then a "very high" pressure level has been reached does not give more information than only signaling that a "very high" pressure level has been reached. Therefore, the alarm "High pressure level" can be removed from the alarm sequence when it precedes the alarm "Very high pressure level" without loss of information related to the dysfunctional behavior of the process. The search of domination relations has to be performed for all couples ({αi}, {αj}) to obtain the shortest reduced sequence S̃. In the present example, three domination relations are found: α1→α5, α1→α7, and α5→α7.

Mutual dependency relationships can also be described and determined by the control circuit 122. Let S be an alarm sequence defining an alphabet ΣS, and αi and αj be two different alarms of ΣS, that define two singleton alphabets {αi} et {αj}. αi and αj are mutually dependent, noted αi ⇆αj, iff the projection of S on {αi} ∪ {αj} is an alternation between a single occurrence of αi and a single occurrence of αj. The mutual dependency is defined below and is similar to a two way domination:
{Proj{αi} ∪ {αj}(S)=αiαj αi αj αi . . .
or
Proj{αi} ∪ {αj}(S)=αj αiαj αi αj . . .

αi and αj are mutually dependent implies that before or after every occurrence of αi (resp. αj) one and only one occurrence of αj (resp. αi) is observed. Therefore, the observation of αi or αj is sufficient to know that the dysfunctional behavior of P is αiαj (or αj αi). In that case, the construction rules 132 created by the expert analyzer 126 can specify that one of the two alarms αi or αj can be removed from S. For example, it is possible to choose to keep the first alarm occurring in the sequence Proj{αi} ∪ {αj}(S).

When applying this mutual dependency relations search on the sequence of the present example:
S=α1α1α5α7α1α8α5α7α1α1α8α1α5α7α8α8, for the two alarms α5 and α7, it comes:
Proj{α5} ∪ {α7}(S)=εεα5α7εεα5α7εεεεα5α7εε
=α5α7α5α7α5α7
=>α5 ⇆α7

As α5⇆α7, α5 or α7 can be suppressed to obtain a reduced S̃. α5 being the first alarm to occur, only this alarm is kept. This gives the following reduced sequence:
S̃=α1α1α5α7α1α8α5α7α1α1α8α1α5α7α8α8
=α1α1α5α1α8α5α1α1α8α1α5α8α8

The physical interpretation of the domination relation can be explained by taking the example of the process P on which S has been observed. In this process, α5 is an alarm meaning that a "Very high pressure level" of a fluid is reached and α7 that the "Exit flow is too fast". The fact that α5 and α7 are mutually dependent reflects the fact that the exit flow is too fast when the pressure reaches the "very high" level, and vice versa. Both alarms give therefore the same information to the operator, but with different words. Therefore, one of these alarms can be suppressed.

For this example, a determination may be made to keep the first alarm that occurs as it allows the problem to be pointed out sooner, but it also may be because the "very high" pressure can be considered as the cause of the exit flow "too fast". Such an expert or machine analysis is undertaken by the expert analyzer 126 to confirm the suppression of alarms, once all domination and mutual dependency relations have been identified. A global view of all relations between alarms is advantageous (and in aspects is mandatory) in order to guarantee consistency of the removing decisions. For example, if a determination is made of S is:

$$\alpha 1 \rightarrow \alpha 5 \quad (1)$$

$$\alpha 5 \leftrightarrows \alpha 7 \quad (2)$$

From (1), it may be determined that α1 can be suppressed when it occurs before α5. Then, by considering only (2), a determination may be made that either α5 or α7 can be suppressed. However, but taking into account also (1), it is no more possible to remove α5 without modifying the observed dysfunctional behavior (the domination relation would be forgotten in that case). These conditions can be formed into the construction rules 132.

As mentioned, to provide this global view of the relation between alarms to the expert analyzer 126, the domination and mutual dependency relations are translated into a graphical and formal representation of autonomous Petri nets.

Also as mentioned, relationships of alarm data can be represented as and visualized as a Petri net. An autonomous Petri net is a directed bipartite graph with two kinds of vertices: places and transitions. Places are drawn as circles and transitions are drawn as bars. Directed arcs go from a place to a transition or vice versa.

Formally, an ordinary Petri net is defined by a 4-tuple:
PN=(P, T, I, O) where:
P={p1, p2, . . . , p|P|} is a finite set of places,
T={t1, t2, . . . , t|T|} is a finite set of transitions,
P∩T=∅
P∪T≠∅
I:P×T→{0,1} is a function representing the existence of arcs going from places to transitions,
O:T×P→{0,1} is a function representing the existence of arcs going from transitions to places,
A marking function M: P→Z+ (Z+ being the set of nonnegative integers) assigns to each place of P a number of tokens; the marking of a PN is usually expressed as a |P|-entry vector. M0 denotes the initial marking of a marked PN=(P, T, I, O, M0). In a PN, a transition tj is enabled at marking Mk if ∀ pi ∈ P, Mk (pi)≥I(pi, tj), an enabled transition tj can be fired, reaching a new marking Mk+1. This behavior is represented as Mk tj→Mk+1. The new marking can be computed as Mk+1=Mk+(O−I)uk, where uk (i)=0, i≠j, and uk (j)=1; this equation is called the PN state equation. The set of all possible reachable markings from M0 by firing only enabled transitions is called the reachability set of a marked PN. In a PN, a source transition is a transition without any input place; it is unconditionally enabled. A sink transition is a transition without any output place; its firing consumes but does not create any token.

Each one of the domination and mutual dependency properties expresses a sequentiality or a concurrency relationship between alarms that can be represented by a generic PN structure, called a Petri net pattern, in which alarms are associated to the transitions.

Figure 2:
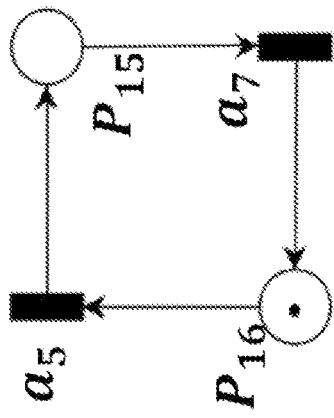
FIG. 2 comprises a diagram of aspects of a system according to various embodiments of the present invention.

FIG. 2 is an example of the generic PN pattern representing a domination relation (in this case α1→α5). This PN expresses that the sink transition α5 (the dominated alarm) can only be fired after the source transition α1 (the dominant alarm) has been fired.

Figure 3:
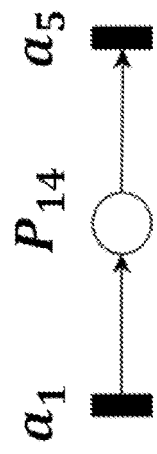
FIG. 3 comprises a diagram of aspects of a system according to various embodiments of the present invention.

FIG. 3 is an example of the generic PN pattern representing a mutual dependency (in this case α5⇆α7). This PN expresses an iterative sequence of firing of the transition α5 and the transition α7. It must be noted that the initial marking of the place P16 imposes that the first enabled transition is α5, translating that α5 is the first alarm occurring in the projection of the sequence S on {α5} ∪ {α7}. Let now consider the set of all relations between alarms found in the sequence S given in this example:

$$\alpha 1 \to \alpha 5 \quad (3)$$

$$\alpha 1 \to \alpha 7 \quad (4)$$

$$\alpha 5 \leftrightarrows \alpha 7 \quad (5)$$

$$\text{no relation for } \alpha 8 \quad (6)$$

Figure 4:
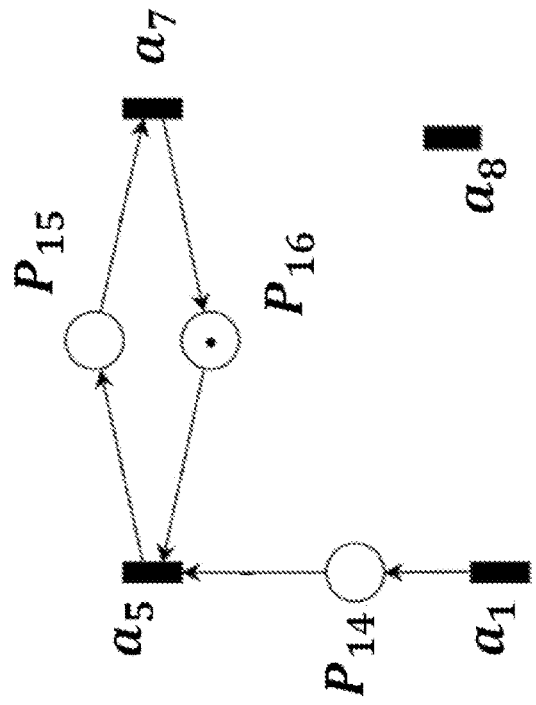
FIG. 4 comprises a diagram of aspects of a system according to various embodiments of the present invention.
Figure 5:
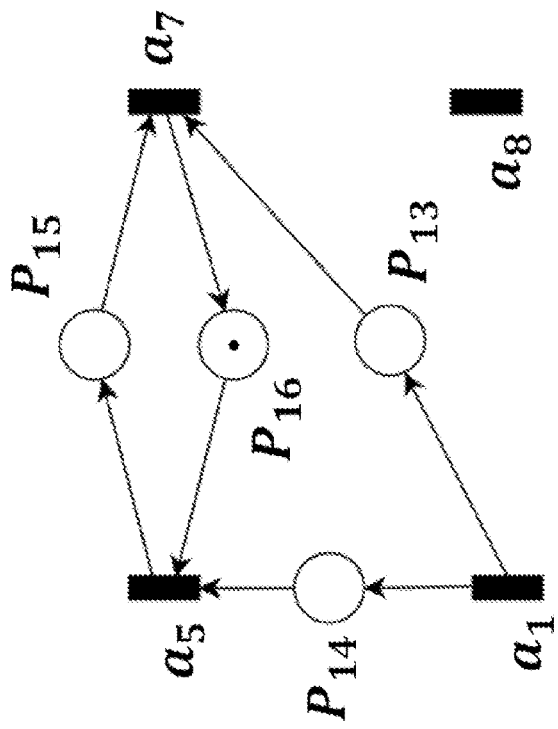
FIG. 5 comprises a diagram of aspects of a system according to various embodiments of the present invention.

The translation of these four relations in PN is shown in FIG. 4. This PN is composed of two patterns of domination relation (relations 3 and 4 above) and one pattern of mutual dependency (relation 5 above), connected by fusing the two transitions related to the same alarm(α5). Alarm α8 does not have any relation with the other alarms: it is therefore represented as a source and sink transition which is not connected to the rest of the PN. Finally, this PN can be simplified, by observing that place P13 is an implicit place, i.e. a place whose suppression does not change the reachability set of the PN [10]. The resulting simplified PN is given in FIG. 5. It provides a graphic global view of all domination and mutual dependency relations found in S and is therefore well adapted to the expert subsequent work that consist in making choices of which alarms can be removed without loss of safety.

An example of analysis provided by the expert analyzer 126 is now described. As mentioned, the present approaches provide for the discovery of systematic relations between alarms, followed by the representation of the discovered relations in the form of Petri net patterns that can be analyzed later on by experts (human or machine) to remove redundant alarm occurrences.

The algorithm to discover systematic relations between alarms must detect, for every couple of alarms, whether a systematic, i.e. for the whole sequence, domination or mutual dependency relationship exists or not. This is done by browsing the sequence for each alarm couple to look for those relations. The theoretical complexity of this algorithm is therefore κ(|ΣS|2|S|). Nevertheless, this algorithm scales well in this example. The global analysis of the considered alarm sequence was performed, for example, in 45 minutes, a quite acceptable duration for such an example in industrial context.

In one example, the automatic analysis of the considered alarm log by this algorithm returned 36 patterns (containing 141 alarms presenting some relations between them) and 348 independent alarms (alarms associated to transitions which are both source and sink, like a8). The most frequent pattern was composed of 2 alarms and occurred 1,051 times while the least frequent pattern was composed of 4 alarms and occurred only 11 times.

Using these identified patterns, expert analysis allowed a 5%-38% reductions of the whole alarm sequence length during varying time periods when the operators are the most solicited. The result was that a 38% reduction of the length of the alarm sub-sequences was achieved during the 10 minutes periods with the largest number of alarms that comprised an alarm flood.

Figure 6:
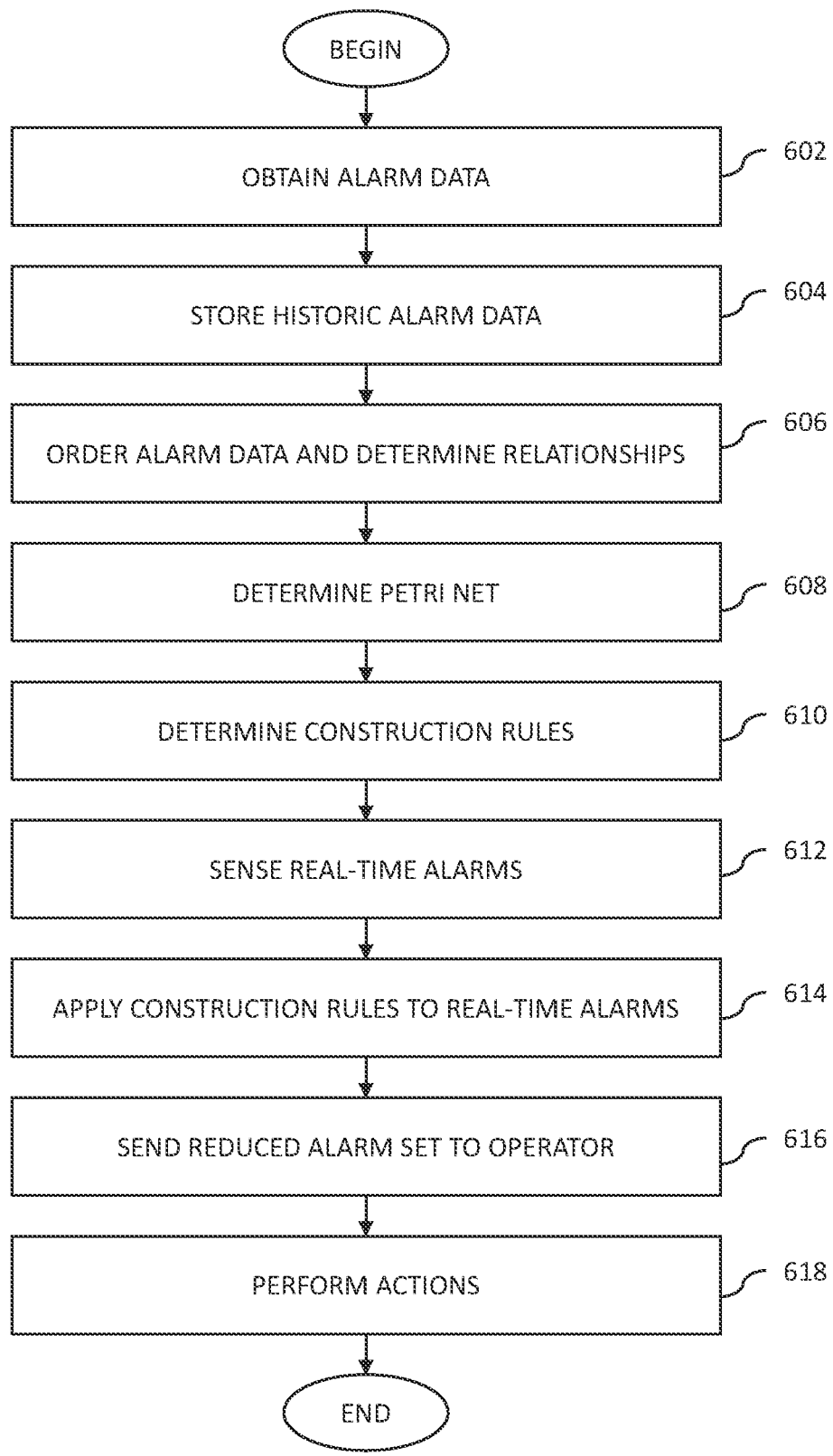
FIG. 6 comprises a flowchart according to various embodiments of the present invention.

Referring now to FIG. 6, one example of an approach for reducing the number of alarms presented to operators is described.

At step 602, alarm data is obtained from sensors in industrial machines. In examples, the sensors measure one or more of the speed, temperature, pressure, direction, size, weight, or dimension of an industrial machine or of an industrial process. In aspects, the industrial machines are one or more of: boilers, fans, engines, wind turbines, generators, manufacturing devices, cutters, drills, saws, presses, vehicles, or power equipment. Other examples are possible. The alarm data is historic data that is measured over long period of times such as days, weeks, months, or years.

At step 604, the historic alarm data is stored at a database, and the database is disposed at a central location. Advantageously, the central location disposition of the database allows a central hub to be used all data. As explained elsewhere herein, processing data at a central location allows uniform rules to be applied to the data resulting more efficient operation of the control circuits used to process the data.

At step 606, the alarm data that has been stored in the database is ordered as a sequence of individual alarms. Relationships between the individual alarms are then selectively determined and the relationships are selectively stored in a mathematical model. The relationships include domination relationships and mutual dependency relationships between the individual alarms. The mathematical model includes discrete alarm events and the sequence of the discrete alarm events. These functions may be performed by a control circuit deployed at the central location.

At step 608, a Petri net that corresponds to the mathematical model is determined and the Petri net includes the domination relationships and mutual dependency relationships between the individual alarms. In some aspects, the mathematical model includes or comprises equations. However, other types of models (e.g., neural networks) may also be used.

At step 610, the Petri net is analyzed to determine a set of construction rules. If the analysis is performed by a human, the Petri net may be visually rendered to the human for analysis. If the Petri net is analyzed by a machine (e.g., a computer program), the Petri net is represented by a data structure and this is analyzed by the machine. The construction rules define an approach to reduce the number of alarms presented to an operator or a computer program. In aspects, the construction rules are implemented as computer code and the computer code is configured with new parameters based upon new alarm data. In other examples, the Petri net represents alarms as unique transitions in the Petri net.

The construction rules may be created manually (e.g., by a human) or automatically (e.g., by a computer program). As mentioned, the construction rules may be represented as computer code and in aspects this computer code dynamically changes over time. For example, the size and internal structure of the code may change. To take one example, the number of physical bytes representing the code may be X bytes and time 1, and Y bytes at time to where Y>X. Changing the internal structure may include adding subroutine calls, removing subroutines calls, adding conditional statements (e.g., IF, THEN statements), removing conditional statements, changing variables, and changing the values of constants. Other examples are possible.

At step 612, a plurality of real-time alarms are then sensed at the industrial machines. At step 614, the construction rules are applied to the real-time alarms to obtain a reduced set of real-time alarms. That is, the alarm data is altered and, more specifically, reduced in physical size.

At step 616, the reduced set of real-time alarms are presented to an operator or to a first computer program. The operator or the computer program causes actions to be performed at step 618, the actions may include activating a selected industrial machine, deactivating a selected industrial machine, sending a message to human for the human to investigate a selected machine, causing a robot to travel to investigate an alarm at a selected industrial machine. Once the robot (e.g., an automated ground vehicle or aerial drone) arrives at the machine, it may physically alter the machine. For example, the robot may remove a part and replace the old part with a new part.

In addition, control signals may be sent to the industrial machine. These control signals may be automatically generated (e.g., by a computer program) or manually generated by an operator. The control signals may cause the machines to operate in specified ways. For example, the control signals may activate an industrial machine, deactivate an industrial machine, adjust the speed of an industrial machine, increase other operating parameters of the machine (e.g., temperature or pressure), or result in a change of state of the machine. In other examples, the control signals may allow access to the machine (lock or unlock a door or compartment that provides access to the machine or lock or unlock a door of the machine itself). The control signals may also control other elements (e.g., a camera at the machine where the control signals focus, zoom, or turn the camera). It will be appreciated that all of these actions are physical interactions between physical elements (e.g., between a robot and the industrial machine).

Figure 7:
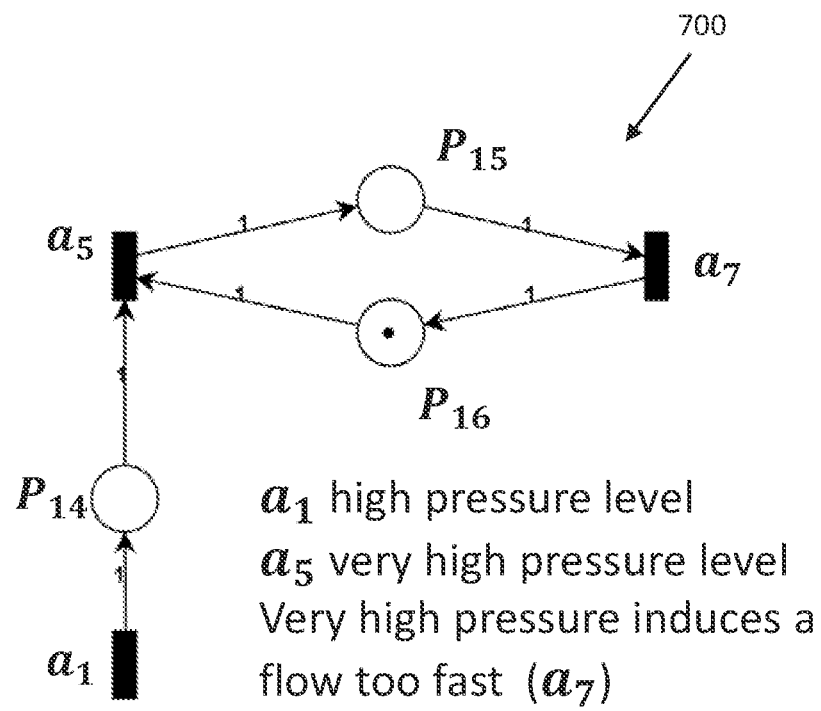
FIG. 7 comprises a diagram of aspects of a system according to various embodiments of the present invention.

Referring now to FIG. 7, one example of the creation of construction rules is described. A Petri net 700 is created. The Petri net 700 includes events a1, a5 and a7, which are alarms.

a1 is an alarm representing a high pressure level. a5 is a very high pressure level. Very high pressure (a5) induces a flow too fast alarm a7. P14, P15, P16 are places. The arcs of the Petri net 700 represent relationships between the alarms.

From this example, it is determined by the expert analyzer that a5 needs a7 to occur. a5 and a7 always occur together. a1 can be removed when a5 occurs. When a5 occurs, a7 can be removed as a5 and a7 always occur together. These construction rules can be manually or automatically indicated or represented by computer code. This can be used by a control circuit to execute a filter for real-time alarms arriving from industrial machines.

Figure 8:
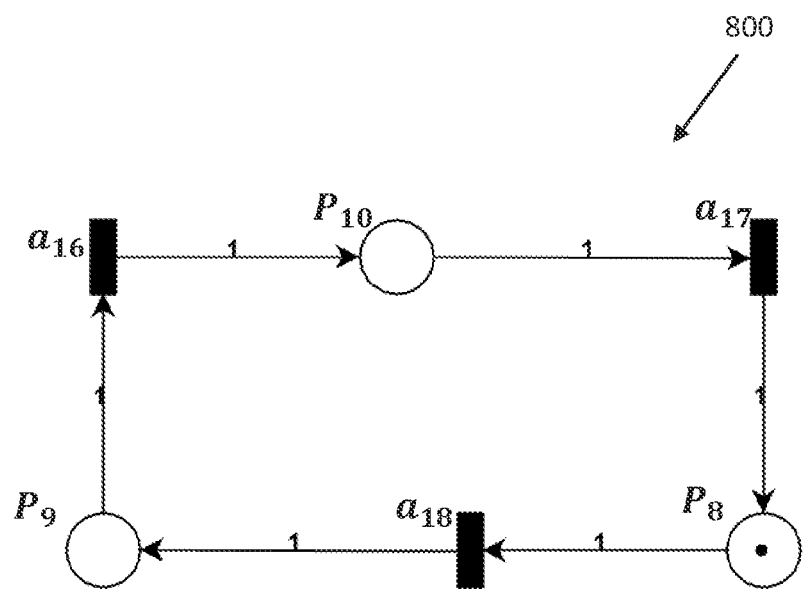
FIG. 8 comprises a diagram of aspects of a system according to various embodiments of the present invention.

Referring now to FIG. 8, another example of creating construction rules is described. A Petri net 800 is created. Three alarms a16, a17, and a18 are associated with the same parameter (e.g., speed or temperature) of an industrial machine. The three alarms always occur together. The construction rule so-formed may be, when a16, a17, and 18 exist, only one is needed and the remaining two can be eliminated from the alarm set. These construction rules can be manually or automatically indicated or represented by computer code. This can be used by a control circuit to execute a filter for real-time alarms arriving from industrial machines.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method, comprising:
   obtaining alarm data from sensors in industrial machines;
   storing the alarm data in a database, the database being disposed at a central location;
   ordering the alarm data as a sequence of individual alarms;
   determining relationships between the individual alarms;
   selectively storing the relationships in a mathematical model;
   wherein the relationships include domination relationships and mutual dependency relationships between the individual alarms, wherein the mathematical model includes discrete alarm events and a sequence of the discrete alarm events;
   determining a Petri net that corresponds to the mathematical model, the Petri net including the domination relationships and the mutual dependency relationships between the individual alarms;
   analyzing the Petri net to determine a set of construction rules, the construction rules defining an approach to reduce a number of alarms presented to an operator or a computer program;
   sensing a plurality of real-time alarms at the industrial machines;
   applying the construction rules to the real-time alarms to obtain a reduced set of real-time alarms; and
   presenting the reduced set of real-time alarms to the operator or the first computer program;
   wherein the operator or the computer program causes actions to be performed, the actions being one or more of: activating a selected industrial machine, deactivating a selected industrial machine, sending a message to a human for the human to investigate a selected machine, and causing a robot to travel to investigate an alarm at a selected industrial machine.

2. The method of claim 1, wherein the construction rules are implemented as computer code and the computer code is configured with new parameters over time based upon new alarm data.

3. The method of claim 1, wherein the industrial machines are one or more of: boilers, fans, engines, wind turbines, generators, manufacturing devices, cutters, drills, saws, presses, vehicles, or power equipment.

4. The method of claim 1, wherein the sensors measure one or more of speed, temperature, pressure, direction, size, weight, or dimension of an industrial machine or of an industrial process.

5. The method of claim 1, wherein the mathematical model includes equations.

6. The method of claim 1, wherein the Petri net represents alarms as unique transitions in the Petri net.

7. The method of claim 1, wherein the analyzing of the Petri net comprises analyzing the Petri net by a second computer program or by a human.

8. A system, comprising:
a plurality of industrial machines;
a plurality of sensors deployed at the industrial machines, the sensors configured to obtain alarm data at the industrial machines;
a database deployed at a central location and wherein the alarm data is stored at the database;
a first control circuit deployed at the central location, the first control circuit configured to order the alarm data in the database as a sequence of individual alarms, determine relationships between the individual alarms, and selectively store the relationships in a mathematical model, wherein the relationships include domination relationships and mutual dependency relationships between the individual alarms, wherein the mathematical model includes discrete alarm events and a sequence of the discrete alarm events;
wherein the first control circuit is configured to determine a Petri net that corresponds to the mathematical model, the Petri net including the domination relationships and the mutual dependency relationships between the individual alarms;
wherein the first control circuit or a human analyzes the Petri net to determine a set of construction rules, the construction rules defining an approach to reduce a number of alarms presented to an operator or a computer program;
wherein the construction rules are sent to a second control circuit via a second network;
wherein the sensors are configured to sense a plurality of real-time alarms at the industrial machines;
wherein the second control circuit is configured to apply the construction rules to the real-time alarms to obtain a reduced set of real-time alarms and to present the reduced set of real-time alarms to the operator or to a first computer program;
wherein the operator or the first computer program causes actions to be performed, the actions being one or more of: activating a selected industrial machine, deactivating a selected industrial machine, sending a message to a human for the human to investigate a selected machine, and causing a robot to travel to investigate an alarm at a selected industrial machine.

9. The system of claim 8, wherein the construction rules are implemented as computer code and the computer code is configured with new parameters over time based upon new alarm data.

10. The system of claim 8, wherein the industrial machines are one or more of: boilers, fans, engines, wind turbines, generators, manufacturing devices, cutters, drills, saws, presses, vehicles, or power equipment.

11. The system of claim 8, wherein the sensors measure one or more of speed, temperature, pressure, direction, size, weight, or dimension of an industrial machine or of an industrial process.

12. The system of claim 8, wherein the mathematical model includes equations.

13. The system of claim 8, wherein the Petri net represents alarms as unique transitions in the Petri net.

14. The system of claim 8, wherein the analyzing of the Petri net comprises analyzing the Petri net by a second computer program or by a human.

15. The system of claim 8, wherein the first control circuit and the second control circuit are separate and wherein the first control circuit stores the alarm data in the database.

* * * * *